United States Patent [19]

Veltri et al.

[11] Patent Number: 4,476,178

[45] Date of Patent: Oct. 9, 1984

[54] COMPOSITE SILICON CARBIDE COATINGS FOR CARBON-CARBON MATERIALS

[75] Inventors: Richard D. Veltri, East Hartford; Francis S. Galasso, Manchester, both of Conn.

[73] Assignee: United Technologies Corporation, Hartford, Conn.

[21] Appl. No.: 391,612

[22] Filed: Jun. 24, 1982

[51] Int. Cl.³ .............................................. B32B 9/00
[52] U.S. Cl. .................................... 428/215; 427/249; 427/252; 427/253; 427/255.4; 428/408
[58] Field of Search .............. 427/249, 255.4, 252, 427/253; 264/81; 428/408, 215

[56] References Cited

U.S. PATENT DOCUMENTS

| | | | |
|---|---|---|---|
| 3,925,577 | 12/1975 | Fatzer et al. | 427/249 |
| 3,935,034 | 1/1976 | Hayes | 148/6 |
| 4,142,008 | 2/1979 | DeBolt | 427/249 |

*Primary Examiner*—George F. Lesmes
*Assistant Examiner*—P. R. Schwartz
*Attorney, Agent, or Firm*—Charles E. Sohl

[57] ABSTRACT

A multilayer coating system for the protection of carbon-carbon composites is described. The coating includes an inner layer of SiC produced by diffusing Si into the carbon substrate (0.5 to 30 mils thick), and at an outer layer of CVD (chemically vapor deposited) SiC (5 to 30 mils thick). Such a coating successfully protects carbon-carbon materials from oxidation at temperatures up to 2500° F. (1371° C.) and above.

9 Claims, 3 Drawing Figures

| TEMP, °F | TIME | WEIGHT CHANGE |
|---|---|---|
| 2000 | 300 hrs | +1.03% |
| 1200 | 5 hrs | −1.76% |
| 2000 | 24 hrs | −1.89% |

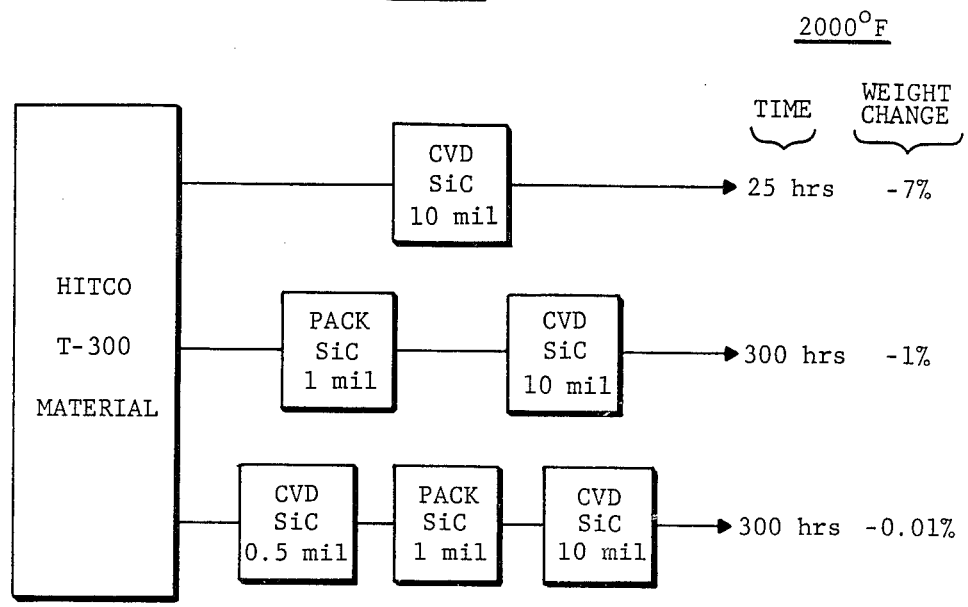

COMPOSITE SILICON CARBIDE COATINGS FOR CARBON-CARBON MATERIALS

DESCRIPTION

1. Technical Field

This invention concerns coatings for carbon base materials, and particularly multilayer or composite coatings for carbon-carbon composite materials.

2. Background Art

Carbon-carbon composites are a class of unique materials whose properties, especially at elevated temperatures, make them attractive for various aerospace applications. The materials are composites Calthough all of the composite elements are comprised essentially of carbon, in its various allotropic forms. Carbon-carbon materials are produced starting with organic precursor fibers such as polyacrylonitrile, rayon or pitch. Such fibers are usually produced in bundles (yarn), often by an extrusion process. The precursor fibers are heated in an inert atmosphere to pyrolyze or carbonize them and may then be heated to a higher temperature (e.g. 4000° F., 2204° C.) to form graphite fibers. These carbon or graphite materials may then be laid down, woven, or interleaved to form what are referred to as 1D, 2D, 3D, etc. structures where D stands for direction (i.e. in a 2D structure, fibers are laid in two (usually orthogonal) directions).

These woven structures can then be impregnated with a pitch or resin material which is converted to carbon and then graphite. In this process, hot pressing is also employed to obtain a dense structure. Repeated impregnation steps can be employed to increase density.

An alternative processing scheme is to use chemical vapor deposition (CVD) to deposit pyrolytic graphite matrix.

The finished product is 90+% carbon, but by virtue of the fiber alignment and other processing details such as densification, has exceptional mechanical properties when compared with other carbon type materials. The mechanical properties are constant, or even increase slightly with temperatures up to about 4000° F. (2204° C.). This temperature capability makes carbon-carbon materials exceptionally attractive for various aerospace applications including gas turbine engines. The obvious drawback is the susceptibility of carbon-carbon materials to oxidation. The present invention concerns a coating to protect carbon-carbon materials from catastrophic oxidation at temperatures up to at least 2500° F. (1371° C.).

It is known in the prior art to use silicon carbide (SIC) conversion coatings to protect carbon base materials, including carbon-carbon composites. Such coatings are termed conversion coatings because the surface of the article to be coated is converted to SiC by reacting it with silicon. Pack coating processes are popular. A carbon article can be embedded and heated in a pack material which will produce Si or Si compound vapors when heated. U.S. Pat. No. 3,095,316 describes pack processes for producing SiC coatings on carbon base articles. Processes using pack compositions based on alumina ($Al_2O_3$), silicon (Si) and silica ($SiO_2$) are known.

U.S. Pat. No. 3,226,194 describes a chemical vapor deposition (CVD) process for applying SiC coatings. U.S. Pat. No. 3,095,316 describes pack processes for applying SiC conversion coatings to carbon base materials.

U.S. Pat. No. 3,406,044 describes methods for coating graphite heating elements, in one embodiment, a silicon containing gas is decomposed on a heated graphite surface to produce a layer of pure silicon which is then melted so that it reacts with the carbon. Subsequently, a layer of CVD SiC is applied. The coating is employed on graphite heaters used in semiconductor processing equipment and prevents vaporization of the graphite which would adversely affect the semiconductor materials.

U.S. Pat. No. 3,925,577 describes a similar process involving deposition of pure silicon on a carbon surface, heating to above the melting point of silicon to react the silicon and carbon and a final CVD layer of SiC.

D. C. Rogers et al have described carbon-carbon materials and a variety of surface coatings (mostly pack), in three articles: "Society for the Advancement of Material and Process Engineering, Conference Proceedings 1973", pp. 202–215; "Society for the Advancement of Material and Process Engineering, Conference Proceedings 1975", pp. 319–336; and "Society for the Advancement of Material and Process Engineering, Conference Proceedings 1976", pp. 308–337.

It is an object of the invention to describe an improved multiple layer coating for the protection to carbon base substrates.

DISCLOSURE OF INVENTION

Carbon-carbon composite materials are coated to render them resistant to elevated temperature oscillation. A multilayer coating is employed. A first or inner layer of SiC is produced by diffusing Si into the carbon-base substrate. This layer has a thickness of from about 0.5 to about 30 mils. A second outer layer of SiC having a thickness of from about 5 to about 25 mils is then applied by chemical vapor deposition. The composite coating provides exceptional oxidation resistance.

The foregoing, and other features and advantages of the present invention, will become more apparent from the following description and accompanying drawing.

BRIEF DESCRIPTION OF THE DRAWING

FIG. 1 is a flow chart describing different coating combinations applied to a carbon-carbon composite and the subsequent oxidation behavior.

FIG. 2 shows the oxidation behavior of a carbon-carbon composite coated according to the present invention.

FIG. 3 shows the oxidation behavior of a carbon-carbon composite coated according to the present invention with an added CVD SiC precoat treatment.

BEST MODE FOR CARRYING OUT THE INVENTION

Carbon-carbon composite materials are provided with exceptional oxidation resistance at elevated temperature by having a composite protective coating applied to their exposed surfaces. The invention composite coating includes two essential components, an initial pack derived SiC conversion coating, and a chemical vapor deposited (CVD) SiC coating over the SiC pack coating.

Carbon-carbon materials thus coated have demonstrated virtual immunity to oxidation at 2500° F. (1371° C.), even after exposure for 500 hours.

The SiC conversion coating has a thickness of 0.5 to 30 mils, preferably 1 to 10 mils. Such a coating can be provided by surrounding the article to be coated with a pack powder mixture containing nominally (by weight) 10% $Al_2O_3$, 60% SiC and 30% Si, and heating the pack (and article) at about 1600° C. for 2 to 10 hours. An improved SiC conversion coating results if 0.1 to 3% (and preferably 0.2 to 1.5%) boron is included in the pack mixture. This is described in commonly assigned, copending application U.S. Ser. No. 391,613 entitled "Deposition of Improved SiC Coatings on Carbon Base Materials" by Galasso and Veltri, filed on even date herewith.

We believe that other pack mixtures can be devised which will produce an equivalent SiC coating. However, we prefer to use packs based on $Al_2O_3+SiC+Si$ with the sum of these three constituents exceeding 80%.

Having applied the SiC conversion coating, an outer coating of CVD SiC is applied. Preferred conditions for depositing CVD SiC on the surface of the carbon-carbon material are to heat the substrate to a temperature of between 1000° C. and 1200° C. while maintaining the substrate in a reduced pressure chamber at a pressure of 2-20 Torr while flowing a mixture of methane, hydrogen, and methyldichlorosilane over the surface of the sample. The ratio of methane to hydrogen to methyldichlorosilane is about 100:100:14. (We believe that ratios of 60-140:60-140: 10-20 are feasible). In the case of a small chamber having a 2 inch (5.08 cm) diameter of 4 inch (10.2 cm) length, 100 cc/min of $CH_4$ and $H_2$ and 13.6 cc/min of methyldichlorosilane were flowed through the chamber to produce the desired coating. The coating thickness is preferably from 3 to 30 mils and most preferably from 5 to 20 mils. A 10 mil coating can be produced in about 8 hours under the described conditions. U.S. Pat. No. 3,226,194 describes this process and is incorporated therein by reference.

An added coating constituent, a preliminary layer of pyrolytic graphite, may advantageously be employed in certain circumstances, particularly in the case of carbon-carbon materials having a coefficient of thermal expansion. Such a layer, having a thickness of 1 to 5 mils, may be produced by flowing a mixture of gases ($CH_4$ and argon in about a 4:1 ratio) over the surface while the surface is heated to a temperature of about 1800° C. in a reaction chamber which is maintained at a pressure of 10-25 Torr.

Such a pyrolytic graphite coating is especially useful in connection with substrates which do not have pyrolytic graphite matrices and which are not 100% dense. The graphite layer provides a uniform surface condition on different carbon-carbon materials so that a SiC conversion coating of uniform quality can be produced. The concept of using an initial pyrolytic graphite layer when coating carbon-carbon composites is described in copending application Ser. No. 391,614 by Veltri and Galasso entitled "Pyrolytic Graphite Coating Pretreatment for Protecting Carbon-Carbon Composites", filed on even date herewith.

Alternatively, a thin layer of CVD SiC may be applied as an initial layer. Such a layer provides substantial benefits when applied to substrates having a low coefficient of thermal expansion (i.e. less than about $0.2 \times 10^{-6}$ and preferably negative).

Preferred conditions for depositing CVD SiC on the surface of the carbon-carbon material are to heat the substrate to a temperature of between 1000° C. and 1200° C. while maintaining the substrate in a reduced pressure chamber at a pressure of 2-20 Torr while flowing a mixture of methane, hydrogen, and methyldichlorosilane over the surface of the sample. The preferred ratio of methane to hydrogen to methyldichlorosilane is about 100:100:14 (ratios of 60-140:-60-140:10-20 appear feasible). In the case of a small chamber having a 2 inch (5.08 cm) inside diameter and a 4 inch (10.2 cm) length, 100 cc/min of $CH_4$ and $H_2$ and 13.6 cc/min of methyldichlorosilane were flowed through the chamber to produce the desired coating. The coating thickness is preferably from 0.1 to 5 mils and can be produced in about 1 to 4 hours under the described conditions. As in the case of the pyrolytic graphite preliminary layer, the thickness of the subsequently deposited SiC conversion layer preferably exceeds the thickness of the CVD SiC layer.

The use of a preliminary CVD SiC is the subject of commonly assigned U.S. patent application Ser. No. 391,615 now U.S. Pat. No. 4,425,407 entitled "CVD SiC Pretreatment in the Coating of Carbon-Carbon Composites" by Galasso and Veltri filed on even date herewith.

FIG. 1 illustrates the performance benefits which result from various coatings in oxidation testing at 2000° F. (1093° C.). A simple CVD SiC coating was relatively ineffective in reducing oxidation, permitting a weight loss of 7% in 25 hours. Adding the pack SiC coating prior to the CVD coating substantially improved the protection, a 300 hour exposure produced a weight loss of about 1%. Adding a preliminary thin CVD SiC coating essentially eliminated oxidation for 300 hours (the observed weight change is within the expected experimental tolerance).

FIG. 2 provides further data on the pack SiC plus CVD SiC embodiment. The weight changes shown are cumulative. It can be seen that the composite coating is reasonably protective both at high temperatures and moderate temperatures (where some prior art coatings have been deficient).

Shown in FIG. 3 is the performance three step coating consisting of thin CVD SiC and pack SiC and thick CVD SiC. The performance is outstanding (again the values shown are cumulative). The three step coating provides substantial protection at 2500° F. (1371° C.).

It should be understood that the invention is not limited to the particular embodiments shown and described herein, but that various changes and modifications may be made without departing from the spirit and scope of this novel concept as defined by the following claims.

We claim:

1. A carbon-carbon composite article adapted to resist environmental degradation at elevated temperatures in oxidizing conditions, which comprises:
   a. a carbon-carbon substrate;
   b. a pack derived conversion coating integral with the substrate surface having a thickness of from about 0.5 to 30 mils consisting essentially of SiC;
   c. a CVD applied layer of SiC on the outer surface of the pack derived SiC layer having a thickness of from about 3 to 30 mils.

2. A carbon-carbon composite article adapted to resist environmental degradation at elevated temperatures which comprises:
   a. a carbon-carbon substrate;
   b. a layer of pyrolytic graphite having a thickness of 1 to 5 mils;

c. a pack derived coating integral with the substrate surface having a thickness of from about 0.5 to 30 mils, consisting essentially of SiC;
d. a CVD applied layer of SiC on the outer surface of the pack derived SiC layer having a thickness of from about 3 to 30 mils.

3. A carbon-carbon composite article adapted to resist environmental degradation at elevated temperatures which comprises:
   a. a carbon-carbon substrate;
   b. a layer of CVD applied SiC having a thickness of from about 0.5 to 5 mils;
   c. a pack derived coating integral with the substrate surface having a thickness of from about 0.5 to 30 mils consisting essentially of SiC;
   d. a CVD applied layer of SiC on the outer surface of the pack derived SiC layer having a thickness of from about 3 to 30 mils.

4. An article as in claims 1, 2 or 3 in which the pack derived SiC coating contains a small but effective quantity of B.

5. An article as in claims 1, 2 or 3 in which the thickness of the pack derived SiC coating is from about 1 to about 10 mils.

6. An article as in claims 1, 2 or 3 in which the thickness of the CVD SiC coating is from about 5 to about 20 mils.

7. A method for increasing the oxidation resistance of carbon-carbon materials including the steps of applying a pack derived conversion coating having a thickness of from about 0.5 to 30 mils consisting essentially of SiC to the carbon-carbon surface, and applying a CVD layer of SiC having a thickness from about 3 to about 30 mils to the surface of the pack derived layer.

8. A method for increasing the oxidation resistance of carbon-carbon materials including the steps of applying a layer of pyrolytic graphite to the surface of the carbon-carbon article, said layer having a thickness of from about 1 to about 5 mils, applying a pack derived coating having a thickness of from about 0.5 to 30 mils consisting essentially of SiC to the pyrolitic graphite layer, and applying a CVD layer of SiC having a thickness from about 3 to about 30 mils to the surface of the pack derived layer.

9. A method for increasing the oxidation resistance of carbon-carbon materials including the steps of applying a layer of CVD SiC to the surface of the carbon-carbon material, said layer having a thickness from about 0.5 to about 5 mils, applying a pack derived conversion coating having a thickness of from about 0.5 to 30 mils consisting essentially of SiC to the CVD SiC layer, and applying a CVD layer of SiC having a thickness from about 3 to about 30 mils to the surface of the pack derived layer.

* * * * *